United States Patent Office 3,631,130
Patented Dec. 28, 1971

3,631,130
METHOD FOR SULFONATING POLY-(ARYLENEOXIDE)
Johann F. Klebe, Schenectady, N.Y., assignor to General Electric Company
No Drawing. Filed June 26, 1970, Ser. No. 50,338
Int. Cl. C08g 23/20
U.S. Cl. 260—2.2     5 Claims

ABSTRACT OF THE DISCLOSURE

A process is provided for sulfonating poly-(2,6-diaryl-1,4-phenylene ethers) with a mixture of chlorosulfonic acid and a nitroalkane. Films made by casting the resulting sulfonated poly-(aryleneoxide) can be employed as ion exchange membranes.

---

The present invention relates to a method for sulfonating poly-(aryleneoxides) having oxyarylene units with pendant monovalent aryl radicals.

As described in Fox et al. Pat. 3,259,592, assigned to the same assignee as the present invention, poly-(2,6-dimethyl-1,4-phenylene ethers) can be readily sulfonated utilizing chlorosulfonic acid over wide ranges of concentration in a suitable solvent medium. The resulting sulfonated polyphenylene ethers have been found to be useful as cation exchange resins. Experience has shown that high performance ion exchange membranes also can be made by the method of Fox et al. because chlorosulfonic acid can be employed at concentration levels during the sulfonation reaction, sufficient to insure the introduction of an optimum ratio of sulfonic acid radicals, per oxyphenylene unit of the polymer.

Although valuable results have been readily achieved prior to the present invention with poly-(2,6-dimethyl-1,4-phenylene ethers) by the above method of Fox et al., attempts to employ the same sulfonation technique with the more oxidatively stable poly-(2,6-diaryl-1,4-phenylene ethers) having pendant aryl radicals, instead of methyl radicals have been unsuccessful. Invariably, gelation of the sulfonated poly-(2,6-diaryl-1,4-phenylene ether) resulted rendering the product useless, unless extreme precautions were taken to avoid the employment of excess chlorosulfonic acid. As a result, ion exchange membranes in the form of sulfonated poly-(aryleneoxide) films having the optimum ratio of sulfonic acid radicals, per oxyarylene units have been limited to the less oxidatively stable sulfonated poly-(2,6-dimethyl-1,4-phenylene ethers).

The present invention is based on the discovery that poly-(2,6-diaryl-1,4-phenylene ethers) can be sulfonated with chlorosulfonic acid over wide ranges of concentration to provide sulfonated polyarylene ethers having an optimum ratio of chemically-combined sulfonate radicals, per oxyphenylene unit, by effecting the sulfonation of the polymer in the presence of an effective amount of a nitroalkane, such as nitromethane.

There is provided by the present invention, a process which comprises:

(1) Agitating at a temperature in the range of between −20° C. to 100° C., a solution comprising a poly-(aryleneoxide), chlorosulfonic acid, and an effective amount of a nitroalkane, until precipitation of sulfonated poly-(aryleneoxide) is achieved, (2) Treating the resulting mixture of (1) with an organic solvent to form a substantially homogeneous solution, and (3) Recovering sulfonated poly-(aryleneoxide) from (2) where the poly-(aryleneoxide) consists essentially of chemically-combined aryloxy units of the formula, (1) 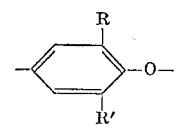

and R and R' are the same or different aryl radicals.

Radicals included by R and R' are aryl radicals such as phenyl, tolyl, naphthyl, xylyl, anthryl, etc.; halogenated derivatives of such aryl radicals such as chlorophenyl, bromonaphthyl, etc. In Formulas 1 and 2 where R and R' represent more than one radical, respectively, these radicals can be all the same or a mixture of any two or more of the aforementioned R and R' radicals.

The poly-(aryleneoxides) which can be employed in the practice of the present invention are shown in the above-mentioned Hay Pat. 3,432,466. Included among the poly-(aryleneoxides) are polymers having the formula, (2) 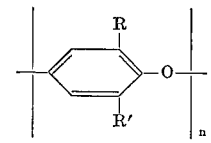

where R and R' are as previously defined and $n$ is an integer having an average value of from about 10 to 10,000, inclusive.

The polymers shown by Formula 2 can be derived from 2,6-diarylphenols such as 2-phenyl-6-(2-methylphenyl)phenol,
2-phenyl-6-(3-metthylphenyl)phenol,
2-phenyl-6-(4-methylphenyl)phenol,
2-phenyl-6-(2-propylphenyl)phenol,
2-(4-isopropylphenyl)-6-phenylphenol,
2-(2-butylphenyl)-6-phenylphenol,
2-(4-t-butylphenyl)-6-phenylphenol,
2-(2-hexylphenyl)-6-phenylphenol,
2-phenyl-6-(4-octylphenyl)phenol,
2-(o-biphenylyl)-6-phenylphenol,
2-(m-biphenylyl)-6-phenylphenol,
2-(p-biphenylyl)-6-phenylphenol,
2-(2-butylphenyl-6-phenylphenol,
2-(4-hexylphenyl)-6-phenylphenol,
2-(2,3-diphenylphenyl)-6-phenylphenol.

The sulfonated poly-(aryleneoxides) provided by the present invention can have an average of from 0.1 to 2, and preferably from 0.5 to 1 sulfonic acid radicals, per aryloxy units of Formula 1. These sulfonated poly-(aryleneoxides) can be cast into films useful as ion exchange membranes, and applications such as fuel cell membranes and battery separators.

In addition to nitromethane, other nitroalkanes which can be employed in the practice of the invention are, for example, nitroethane, nitropropane, nitrobutane, etc.

In the practice of the invention, a solution of poly-(aryleneoxide), chlorosulfonic acid, nitroalkane, and a halogenated aliphatic organic solvent is agitated under conditions suitable for effecting the sulfonation of the poly-(aryleneoxide). Upon precipitation of sulfonated poly-(aryleneoxide), a polar or hydroxylic organic solvent is added to redissolve sulfonated poly-(aryleneoxide) and provide recovery of the sulfonated polymer from the reaction mixture. The order of addition of the various reactants is not critical. It is preferred to add the chlorosulfonic acid to an organic solvent solution of the poly-(aryleneoxide). Suitable organic solvents which can be employed to dissolve the poly-aryleneoxide) during the sulfonation reaction are, for example, methylene chloride, chloroform, sym.-tetrachloroethane, and methylchloroform and other halogenated aliphatic solvents which are inert to the reactants during the sulfonation of the poly-(aryleneoxide). The chlorosulfonic acid can be employed in an amount sufficient to provide an average of at least about 1 sulfonic acid radical for every 2 aryloxy units of the poly-(aryleneoxide).

The addition of the nitroalkane can be effected concurrently with the addition of chlorosulfonic acid or, if desired, it can be employed along with the poly-(aryleneoxide) prior to the addition of the chlorosulfonic acid. There can be employed from about 0.5 to 10 moles or more of nitralkane for each mole or chlorosulfonic acid. At the termination of the sulfonation reaction, the sulfonated poly-(aryleneoxide) readily separates from the reaction mixture to produce a two-phase system. The upper supernatant liquid can be readily decanted from the sulfonated poly-(aryleneoxide). The sulfonated poly-(aryleneoxide) is then treated with an aliphatic polar or hydroxylic organic solvent to redissolve the sulfonated poly-(acryleneoxide), the mixture can be poured into a solvents are, for example, methanol, ethanol, isopropanol, acetone and other aliphatic hydroxylic organic or polar organic solvents which do not react with the sulfonated poly-(aryleneoxide). Upon dissolution of the sulfonated poly-(aryleneoxnde), the mixture can be poured into a suitable organic liquid medium, for example diethyl ether, n-hexane, etc., to effect the precipitation of the sulfonated poly-(aryleneoxide) for purposes of removing undesired impurities and by-products in accordance with standard procedures known to the art. The sulfonated poly-(aryleneoxide) can then be redissolved in a suitable organic solvent and cast on a substrate, such as aluminum to produce a film of desired thickness.

In order that those skilled in the art will better be able to practice the invention, the following examples are given by way of illustration and not by way of limitation:

EXAMPLE 1

A solution of 9.5 parts of chlorosulfonic acid in about 95 parts of nitromethane was added to a solution of 10 parts of a poly-(2,6-diphenyl-1,4-phenylene ether) having a molecular weight of about 100,000 dissolved in about 150 parts of chloroform. The mixture was stirred for 15 hours at a temperature of 25-30° C. There was obtained a two-phase mixture consisting of an upper liquid phase and a viscous semi-solid as a lower phase. The liquid phase was decanted from the mixture. A sulfonated poly-(aryleneoxide) was recovered as a white gum by dissolving the viscous semi-solid in methanol, and precipitating the sulfonated polymer with concentrated hydrochloric acid followed by rinsing with distilled water until all soluble acid was removed. Based on method of preparation and elemental analysis for sulfur (9.8% S), there was obtained about an 80 percent yield of a sulfonated poly-(2,6-diphenyl-1,4-phenylene ether) having an average of about one $SO_3H$ radical for each 2,6-diphenyl-1,4-phenyleneoxy unit.

Following the teaching of Example 1, Hodgdon Pat. 3,484,293 assigned to the same assignee as the present invention, a film of the sulfonated polymer is cast from methanol solution consisting of about 20 parts of polymer and 100 parts of methanol. A small portion of the film is ion exchanged to the potassium ion form to determine its transverse resistivity using a General Radio resistance bridge at 1 kc. It is found to be suitable for cell use.

Sulfonation of the same poly-(2,6-diphenyl-1,4-phenylene ether) is repeated, as described above, except that 95 parts of chloroform is substituted for the 95 parts of nitromethane. Accordingly, a solution of 9.5 parts of chlorosulfonic acid in 95 parts of chloroform is slowly added at 25-30° C. to the stirred solution of 10 parts of the poly-(2,6-diphenyl-1,4-phenylene ether) in 150 parts of chloroform. Before all of the chlorosulfonic acid is added, product precipitates from the reaction mixture. In contrast to the previous result, the product is found to be insoluble in several organic solvents, such as methanol and several other polar and hydroxylic solvents a few minutes after the precipitation has occurred. Instead of soluble sulfonated polymer, the product is a useless gel.

Although the above example is limited to only a few of the very many parameters which can be employed in the practice of the invention, such as varieties of poly-(aryleneoxide), organic solvents, nitroalkanes, etc., the method of the invention is broadly applicable to the sulfonation poly-(aryleneoxide) having recurring units of Formula 1, using a nitroalkane and the various organic solvents as previously defined.

What is claimed is:
1. A process which comprises:
   (1) agitating at a temperature in the range of between —20° C. to 100° C., a solution comprising a poly-(aryleneoxide, chlorosulfonic acid, and an effective amount of a nitroalkane, until precipitation of sulfonated poly-(aryleneoxide) is achieved,
   (2) treating the resulting mixture of (1) with an organic solvent to form a substantially homogeneous solution, and
   (3) recovering sulfonated poly-(aryleneoxide) from (2), where the poly-(aryleneoxide) consists essentially of chemically-combined aryloxy units of the formula,

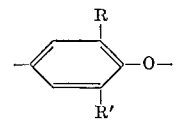

and R and R' are the same or different aryl radicals.
2. The method of claim 1, where the poly-(aryleneoxide) consists of chemically-combined 2,6-diphenyl-1,4-phenyleneoxy units.
3. The method of claim 1, wherein the nitroalkane is nitromethane.
4. The method of claim 1, where the organic solvent is methanol.
5. A process which comprises:
   (1) agitating at a temperature in the range of between —20° C. to 100° C., a solution comprising a poly-(2,6-diphenyl - 1,4 - phenylene ether), chlorosulfonic acid and an effective amount of nitromethane until precipitation of sulfonated poly-(phenyleneoxide) is achieved,
   (2) treating the resulting mixture of (1) with methanol to form a substantially homogeneous solution, and
   (3) recovering sulfonated poly-(phenyleneoxide) from (2).

References Cited
UNITED STATES PATENTS
3,259,592   7/1966   Fox et al.

MELVIN GOLDSTEIN, Primary Examiner

U.S. Cl. X.R.
260—47 ET, 49, 686